(12) United States Patent
Williams et al.

(10) Patent No.: US 11,085,498 B2
(45) Date of Patent: Aug. 10, 2021

(54) DISCONNECT CLUTCH

(71) Applicant: Caterpillar SARL, Geneva (CH)

(72) Inventors: Dominic Williams, West Midlands (GB); Sergei Penksik, Wombourne (GB); Richard Hubble, West Midlands (GB); Guy Blundell, Oundle (GB); Paolo Caporizzo, Peterborough (GB); Guillaume Bernard, Peterborough (GB)

(73) Assignee: Caterpillar SARL, Geneva (CH)

( * ) Notice: Subject to any disclaimer, the term of this patent is extended or adjusted under 35 U.S.C. 154(b) by 67 days.

(21) Appl. No.: 16/406,582

(22) Filed: May 8, 2019

(65) Prior Publication Data

US 2019/0368557 A1 Dec. 5, 2019

(30) Foreign Application Priority Data

Jun. 1, 2018 (GB) .................................... 1809016

(51) Int. Cl.
| | | |
|---|---|---|
| *F16D 43/284* | (2006.01) | |
| *F16D 13/46* | (2006.01) | |
| *F16D 25/0638* | (2006.01) | |

(52) U.S. Cl.
CPC ............ *F16D 43/284* (2013.01); *F16D 13/46* (2013.01); *F16D 25/0638* (2013.01)

(58) Field of Classification Search
USPC ...................................................... 192/105 F
See application file for complete search history.

(56) References Cited

U.S. PATENT DOCUMENTS

| | | | |
|---|---|---|---|
| 3,176,813 A | * | 4/1965 | Lee .................. F16D 43/284 192/85.02 |
| 3,282,385 A | | 11/1966 | Snyder |
| 4,091,899 A | * | 5/1978 | Stevenson ............. F16D 43/284 192/103 FA |
| 4,147,245 A | * | 4/1979 | Folomin ............. F16D 25/0638 192/106 F |
| 4,399,900 A | | 8/1983 | Ballendux et al. |
| 4,586,594 A | | 5/1986 | Duminy |
| 4,708,229 A | | 11/1987 | Anderson et al. |
| 9,593,723 B2 | | 3/2017 | Anderson et al. |

FOREIGN PATENT DOCUMENTS

| | | | | |
|---|---|---|---|---|
| GB | 628523 A | * | 8/1949 | ........... F16D 43/284 |
| GB | 706853 | | 4/1954 | |
| GB | 458835 | | 10/1956 | |
| GB | 2151725 A | * | 7/1985 | ........... F16D 43/284 |
| JP | 59099125 A | * | 6/1984 | ............. F16D 48/02 |

OTHER PUBLICATIONS

Search Report for related United Kingdom Application No. 1809016.7; report dated Dec. 3, 2018.

* cited by examiner

*Primary Examiner* — Timothy Hannon

(57) ABSTRACT

A disconnect clutch comprises a passive centrifugal valve that is utilized to disconnect parasitic loads from an engine during the initial start-up and to automatically connect the parasitic loads once the engine speed is sufficient. The passive centrifugal valve operates dependent on a rotational speed of a flywheel assembly of the clutch and is configured to switch at a threshold rotational speed of the flywheel assembly.

20 Claims, 4 Drawing Sheets

DISCONNECT CLUTCH

CROSS-REFERENCE TO RELATED APPLICATION

This application claims priority under 35 USC § 119 and the Paris Convention to United Kingdom Patent Application No. 1809016.7 filed on Jun. 1, 2018.

TECHNICAL FIELD

The present disclosure generally relates to engines and, more particularly, relates to a disconnect clutch for controlling the connection of parasitic loads to engines.

BACKGROUND

Diesel engines are used in a wide variety of industrial applications. These engines are known as compression ignition engines because they are internal combustion engines that utilize the heat of compression to ignite the diesel fuel in the combustion chamber of the engine.

Diesel engines can, from time to time, experience difficulties when starting, particularly in cold ambient temperatures. One contributing factor is the continuous parasitic loads placed on the engine during start-up.

U.S. Pat. No. 4,708,229, issued on Nov. 24, 1987, discloses a drive that permits engine driven accessories to be momentarily disengaged from the engine during start-up. This type of design has structural drawbacks and does not allow for disengagement of accessories during engine idling. A better design is needed to control the connection of parasitic loads during start-up and idle.

U.S. Pat. No. 9,593,723, issued on Mar. 14, 2017 discloses a disconnecting clutch that permits engine driven accessories to be disconnected from the engine during start-up. But that type of design does not allow to use a "passive" control system that required for low cost base-line engine and drive train applications due to a risk of premature clutch engagement at the engine cold start.

SUMMARY OF THE DISCLOSURE

In accordance with one aspect of the disclosure, a disconnect clutch comprises:
a) a flywheel assembly that includes;
   a flywheel having a cavity, the flywheel including an end plate; and
   a chamber disposed inside the cavity and defined by the flywheel and a piston; the piston being disposed inside the cavity and moveable between a contracted position and an expanded position;
b) a friction plate disposed inside the cavity between the piston and the end plate, the friction plate attached to and rotatable with the flywheel assembly when the piston is in the expanded position and spaced apart from the flywheel assembly and generally stationary when the piston is in the contracted position; and
c) a coupling operably connected to the friction plate;
the flywheel comprising a fill aperture for supplying fluid to the chamber and a drainage conduit for removing fluid from the chamber;
the drainage conduit comprising a passive centrifugal valve which is movable between an open position and a closed position dependent on a rotational speed of the flywheel assembly;

the passive centrifugal valve being configured to adopt its open position when the flywheel assembly is stationary or rotating below a threshold rotational speed such that fluid supplied to the chamber through the fill aperture is able to be removed through the drainage conduit without creating sufficient pressure in the chamber to move the piston from the contracted position to the expanded position; and the passive centrifugal valve being configured to adopt its closed position when the flywheel assembly is rotating above the threshold rotational speed such that fluid supplied to the chamber through the fill aperture is unable to be removed through the drainage conduit leading to sufficient pressure being developed in the chamber to move the piston from the contracted position to the expanded position.

The passive centrifugal valve may be configured to be moved from its open position to its closed position solely by centrifugal forces imparted by rotation of the flywheel assembly.

The drainage conduit may extend through a body of the flywheel between a drain aperture in a wall of the chamber and an exit aperture of the passive centrifugal valve. The drainage conduit may exit the flywheel on a side surface of the flywheel.

The passive centrifugal valve may comprise a valve member and a valve seat with the valve member being configured to be reciprocally movable along a valve axis between an unseated position in which the valve member is disengaged from the valve seat and a seated position in which the valve member is engaged with the valve seat. The valve member may be in its unseated position when the passive centrifugal valve is in its open position and the valve member may be in its seated position when the passive centrifugal valve is in its closed position.

The valve axis may be orientated perpendicularly or substantially perpendicularly to a longitudinal axis of the disconnect clutch. The passive centrifugal valve may comprise a biasing member which biases the valve member into its unseated position.

The flywheel assembly may further comprise a pressure plate disposed inside the cavity between the piston and the friction plate.

There may be a plurality of friction plates. A separating plate may be disposed in the cavity between a first friction plate and a second friction plate.

In accordance with another aspect of the disclosure, a machine is provided comprising a disconnect clutch as described in the above aspect, wherein the disconnect clutch is connected between an engine of the machine and a parasitic load of the machine.

The fill aperture of the flywheel may be fluidly connected to an engine fluid supply gallery of the machine; and wherein the fill aperture of the flywheel may be preferably directly connected to the engine fluid supply gallery of the machine.

The disconnect clutch may be disposed in a clutch housing and the clutch housing may comprise a fluid supply conduit connecting the engine fluid supply gallery to the fill aperture.

In accordance with another aspect of the disclosure, a method of controlling the connection of a parasitic load to an engine disposed on a machine is provided, the method comprising:
a) rotating a flywheel assembly connected to the engine, the flywheel assembly having an interior and including a flywheel, a piston and a chamber disposed in the interior, the chamber defined by the flywheel and the piston and comprising a drainage conduit;

b) supplying fluid to the chamber via a fill aperture and controlling fluid passage out of the chamber via the drainage conduit by use of a passive centrifugal valve in the drainage conduit which is movable between an open position and a closed position dependent on a rotational speed of the flywheel assembly; and c) connecting the engine to the parasitic load only when a rotational speed of the flywheel assembly exceeds a threshold rotational speed;

wherein connection of the engine to the parasitic load is by movement of the piston to an expanded position to attach a friction plate disposed inside the interior of the rotating flywheel assembly to the rotating flywheel assembly, the friction plate being operably connected to the parasitic load;

movement of the piston to the expanded position is by developing a sufficient fluid pressure in the chamber;

the piston remains in a contracted position with the friction plate disengaged from the rotating flywheel assembly when the passive centrifugal valve is in its open position thereby enabling drainage of the fluid from the chamber through the drainage conduit thereby preventing the sufficient fluid pressure in the chamber being attained;

the piston is moved into the expanded position when the passive centrifugal valve is in its closed position thereby preventing drainage of the fluid from the chamber through the drainage conduit such that the sufficient fluid pressure in the chamber is attained;

wherein the passive centrifugal valve adopts its open position when the flywheel assembly is stationary or rotating below the threshold rotational speed and adopts its closed position when the flywheel assembly is rotating above the threshold rotational speed.

The passive centrifugal valve may be moved from its open position to its closed position solely by centrifugal forces imparted by rotation of the flywheel assembly.

The passive centrifugal valve may comprise a valve member and a valve seat and the valve member may reciprocally move along a valve axis between an unseated position in which the valve member is disengaged from the valve seat and a seated position in which the valve member is engaged with the valve seat; the valve member may be unseated when the passive centrifugal valve is in its open position and the valve member may be seated when the passive centrifugal valve is in its closed position.

The valve axis may be orientated perpendicularly or substantially perpendicularly to a longitudinal axis of the disconnect clutch. The valve member may be biased to be unseated.

The fluid may be supplied to the chamber o an engine fluid supply gallery of the machine.

The method may further comprise controlling the supplying of fluid to the chamber based on engine or machine operating parameters.

BRIEF DESCRIPTION OF THE DRAWINGS

Embodiments of the present disclosure will now be described, by way of example only, with reference to the accompanying drawings, in which.

DETAILED DESCRIPTION

Figure 1:
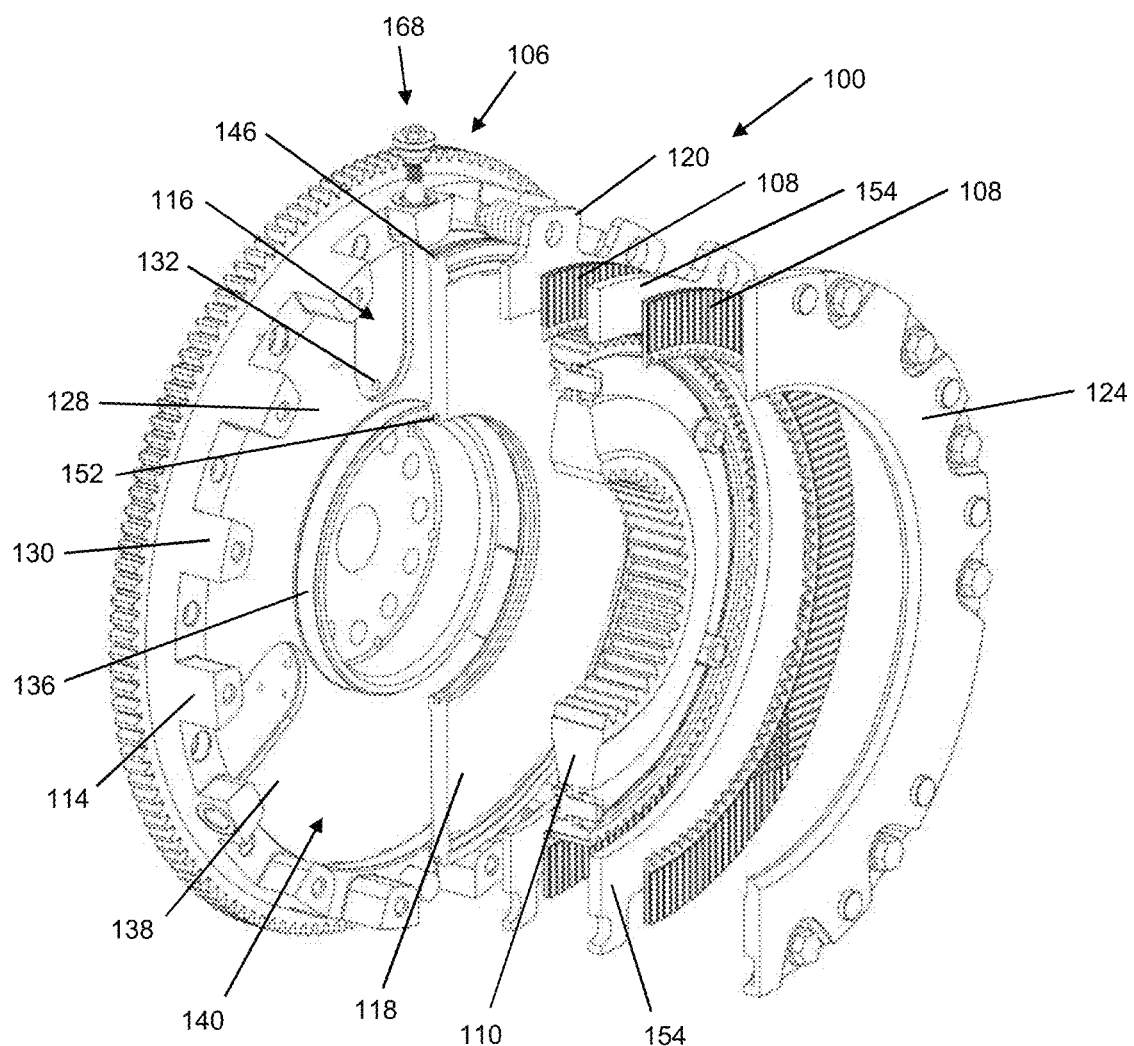
FIG. 1 is a perspective exploded view of a disconnect clutch.
Figure 5:
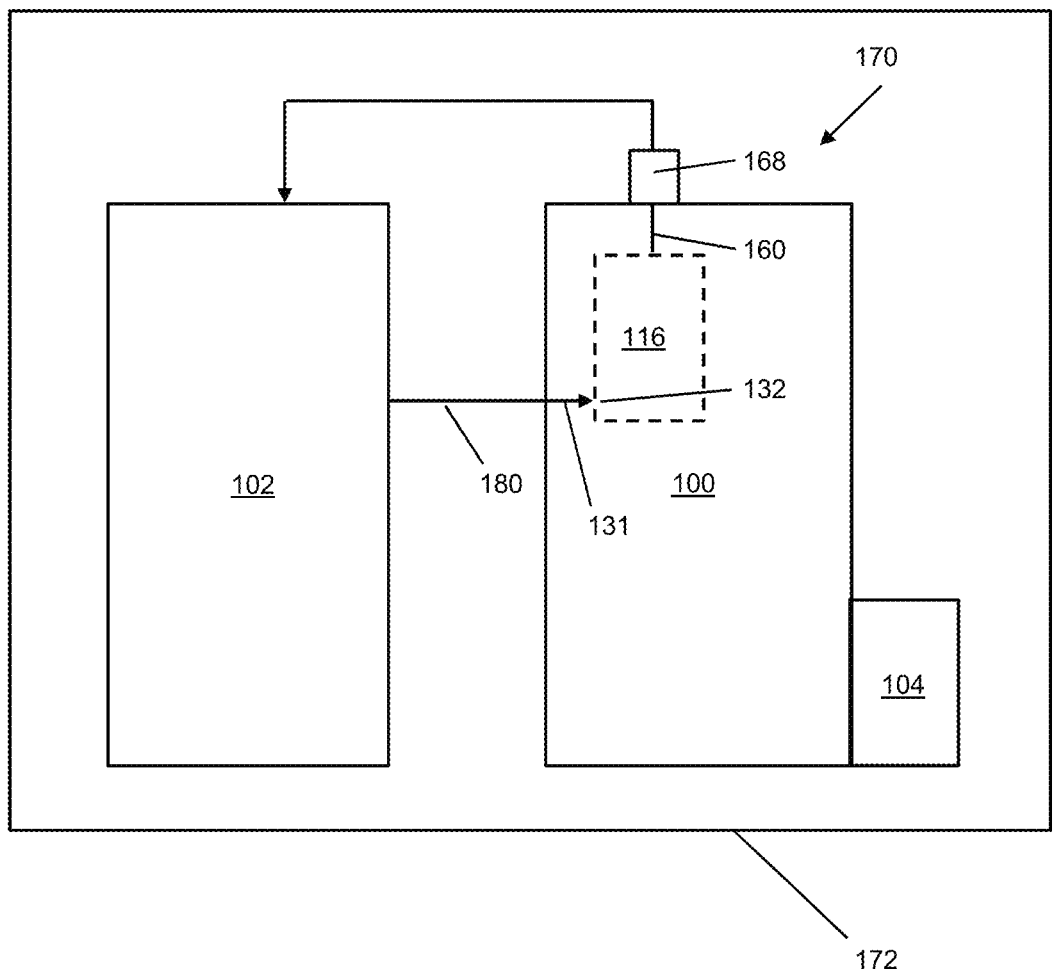
FIG. 5 is a schematic of the disconnect clutch on a machine.

Referring now to the drawings, and with specific reference to FIGS. 1 and 5, there is shown an embodiment of a disconnect clutch constructed in accordance with the present disclosure and generally referred to by reference numeral 100. The disconnect clutch 100 may be attached to an exemplary engine 102. The disconnect clutch 100 may be attached to at least one parasitic load 104. While the following detailed description and drawings are made with reference to a disconnect clutch 100 for a truck engine or an engine used in mining or construction machines, the teachings of this disclosure may be employed on other types of vehicles.

The disconnect clutch 100 may comprise a flywheel assembly 106, at least one friction plate 108 and a coupling 110.

Figure 2:
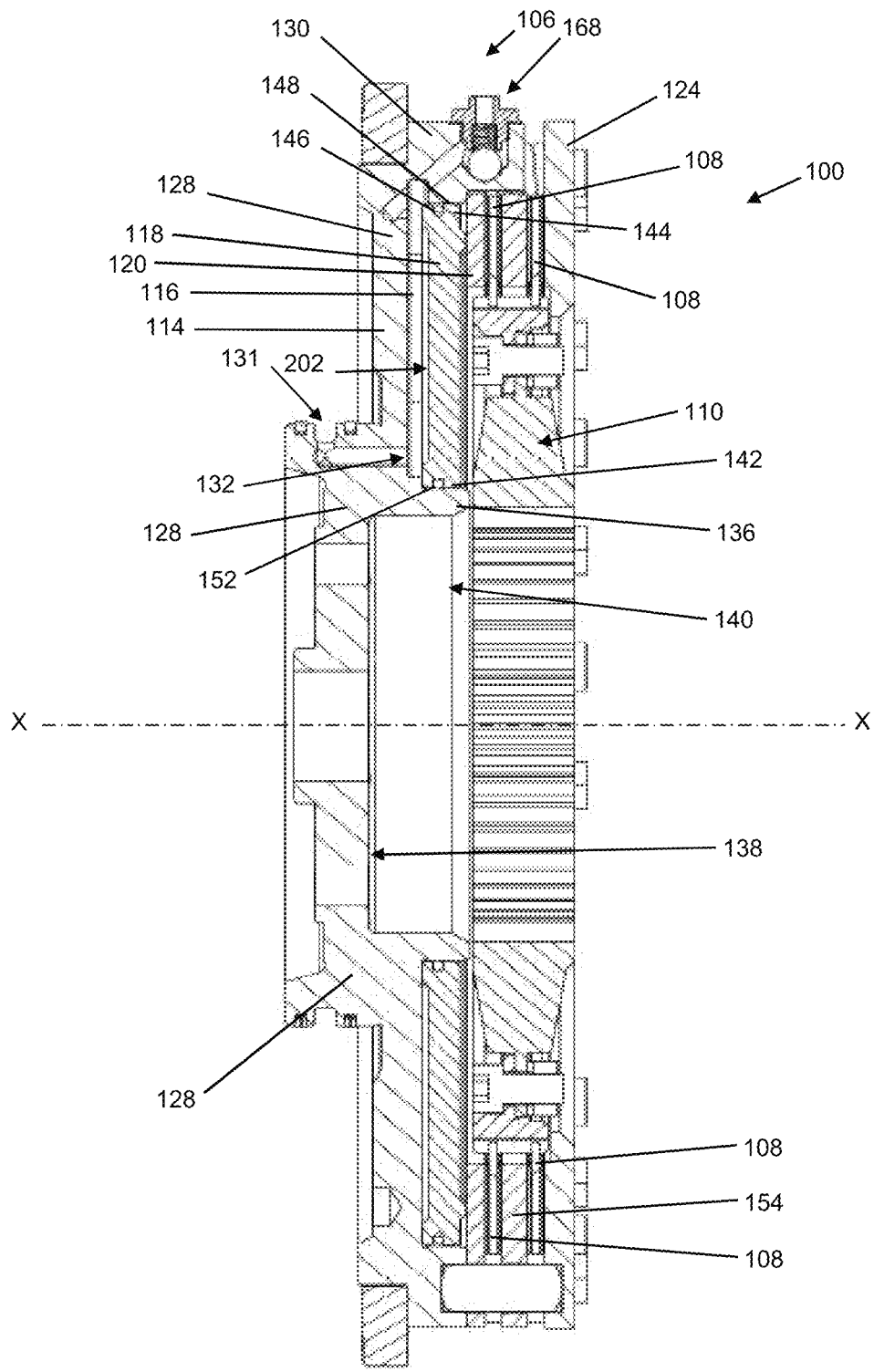
FIG. 2 is a cross-sectional view of the disconnect clutch of FIG. 1.

The flywheel assembly 106 is rotatable about an X-axis as shown in FIG. 2 and may include a flywheel 114, a chamber 116, a piston 118, a pressure plate 120, and at least one passive centrifugal valve 168.

The flywheel assembly 106 is operably connected to the engine 102. In one embodiment, the flywheel 114 may be connected to a crankshaft of the engine 102 and may rotate with the crankshaft.

The flywheel 114 may be annular and may define a cavity 202. The flywheel 114 may include a front member 128, a side member 130 and an end plate 124. The front member 128 may include a fill conduit 131 that leads to a fill aperture 132 that opens into the chamber 116. The front member 128 may include a ledge 136 that extends from an inner face 138 of the front member 128 into the interior 140 of the flywheel assembly 106. The ledge 136 may be disposed adjacent to and under a piston inner circumference 142. The side member 130 may be generally annular and may be disposed between the front member 128 and the end plate 124. The end plate 124 may be annular in shape and may be attached to the side member 130. In some embodiments, the end plate 124 may be generally parallel to the front member 128.

The chamber 116 may be defined by the flywheel 114 and the piston 118. The piston 118 is moveable between a contracted position and an expanded position. In other words, the volume of the chamber 116 between the front member 128 and the piston 118 can be contracted and expanded by movement of the piston 118.

The piston 118 is disposed inside the interior 140 of the flywheel assembly 106. The piston 118 may be annular in shape and have an inner diameter that defines the piston inner circumference 142 and an outer diameter that defines a piston outer circumference 144. The piston outer circumference 144 may be disposed adjacent to the interior surface 148 of the side member 130 of the flywheel 114, and the piston inner circumference 142 may be disposed adjacent to the ledge 136. A seal 146 may be disposed around the piston outer circumference 144 to provide sealing engagement between the piston 118 and the interior surface 148 of the side member 130 of the flywheel 114, and another seal 152 may be disposed around the piston inner circumference 142 to provide sealing engagement between the piston 118 and the ledge 136. The piston 118 may be slidable along the interior surface 148 of the side member 130 of the flywheel 114 to allow for expansion of the volume of the chamber 116, and may be slidable along the ledge 136.

The pressure plate 120 may be disposed inside the cavity 202 between the piston 118 and the friction plate(s) 108. The pressure plate 120 may be annular in shape.

The disconnect clutch 100 may include one or more friction plate(s) 108 disposed in the interior 140 of the flywheel assembly 106 between the pressure plate 120 and the end plate 124. The friction plate(s) 108 may be annular in shape.

The disconnect clutch 100 may include one or more separating plate(s) 154 disposed in the interior 140 of the flywheel assembly 106 between the friction plates 108. The separating plate(s) 154 may be annular in shape.

The coupling 110 may be operably connected to the friction plate(s) 108. In one embodiment (as best seen in FIG. 1), the coupling 110 may be an annular torsional coupling 110. In an embodiment, both the torsional coupling 110 and the friction plate 108 may be splined to provide a meshing connection between the two. In other embodiments, the coupling 110 may be a transmission (not shown) that is operably connected to the friction plate 108. The coupling 110 is operably connected to the parasitic load. Parasitic loads may be accessory loads such as a steering pump, a fan hydraulic pump, a brake charging pump, an implement pump, a transmission, a transmission shaft, a torque converter, an engine cooling fan, and the like. Where the parasitic load is a transmission shaft, the transmission shaft may be operably connected to other parasitic loads such as a steering pump, a fan hydraulic pump, a brake charging pump, an implement pump, the transmission, a torque converter, and the like. The friction plate 108 is attached to and rotatable with the flywheel assembly 106 when the piston 118 is in the expanded position (and the volume of the chamber 116 is expanded). The friction plate 108 is spaced apart from the flywheel assembly 106, more specifically the pressure plate 120 and the end plate 124 of the flywheel assembly 106, when the piston 118 is in the contracted position (and the volume of the chamber 116 is contracted). When the friction plate 108 is spaced apart from the pressure plate 120 and the end plate 124, the friction plate 108 is generally stationary even though the flywheel assembly 106 (including the pressure plate 120 and the end plate 124) may be rotating.

Figure 3:
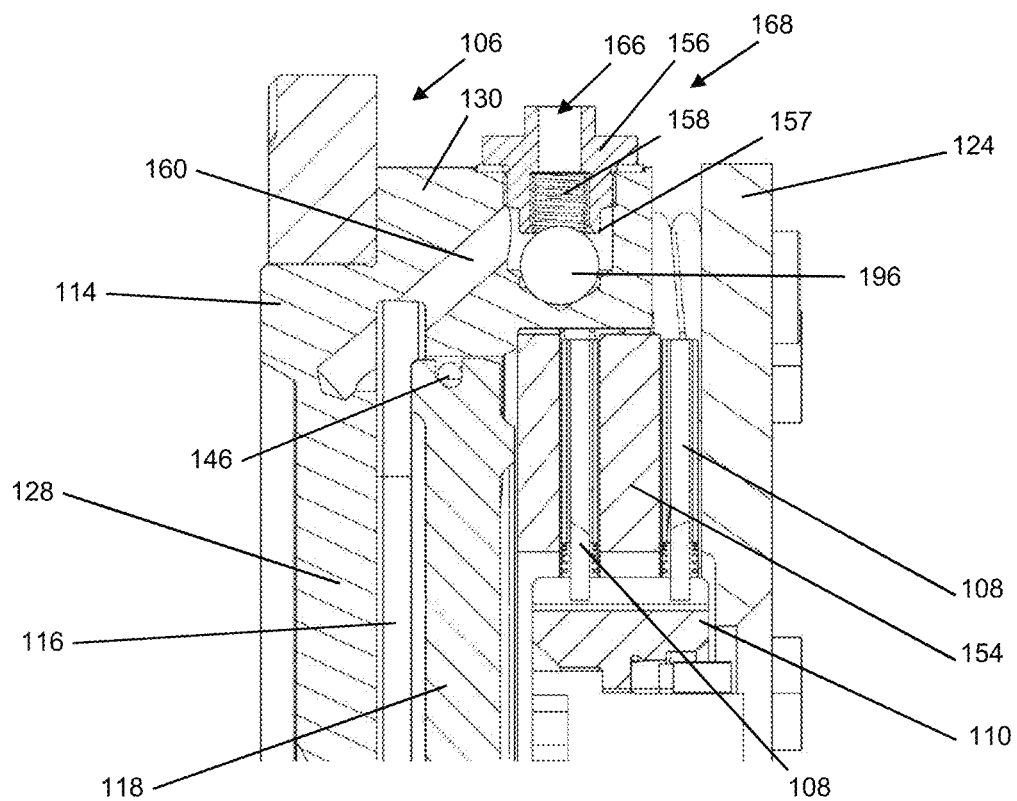
FIG. 3 is an enlarged view of a portion of the disconnect clutch of FIG. 1 showing a passive centrifugal valve of the disconnect clutch in an open position.
Figure 4:
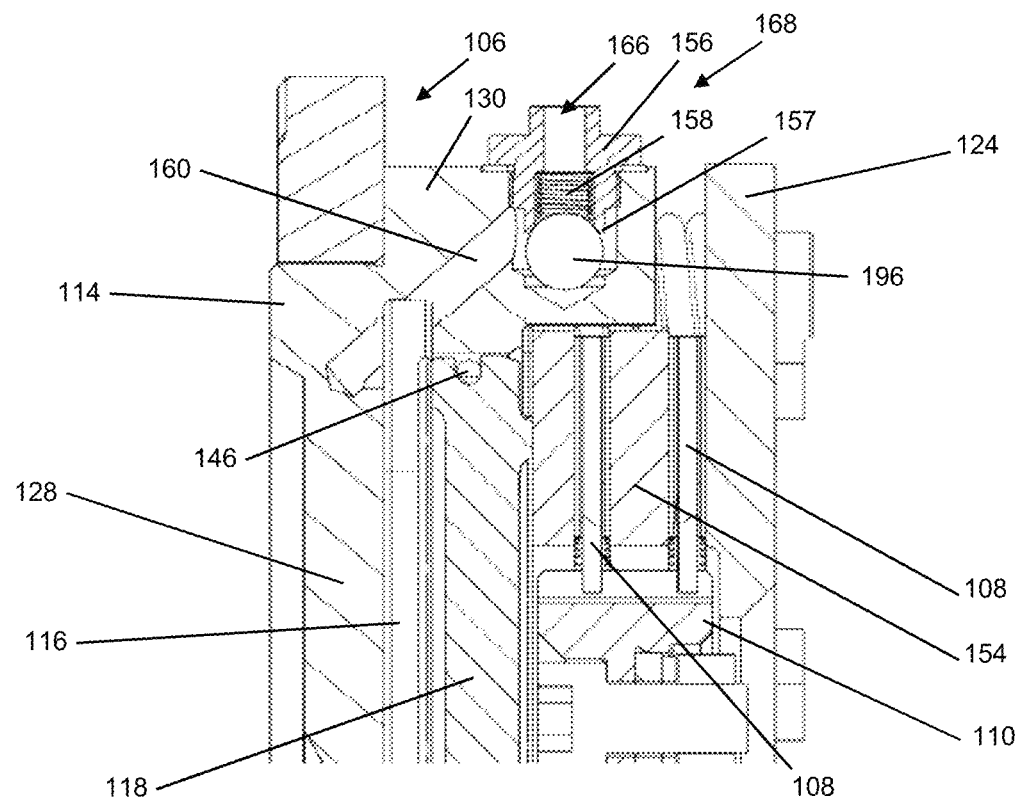
FIG. 4 is the same view as FIG. 3 showing the passive centrifugal valve of the disconnect clutch in a closed position.

The flywheel 114 may also include at least one passive centrifugal valve 168. As shown in FIGS. 3 and 4, the flywheel 114 may include the passive centrifugal valve 168 disposed through the side member 130. In one embodiment, the passive centrifugal valve 168 may be fluidly connected to the chamber 116 by a drainage conduit 160 that extends through an interior of the body of the flywheel 114. As shown in FIG. 3, the drainage conduit 160 may open into the chamber 116 at or near an outer peripheral edge of the chamber 116. The drainage conduit 160 may extend at an angle to the X-axis. The drainage conduit 160 may be angled so as to extend radially outwardly and towards the end plate 124. Thus, the passive centrifugal valve 168 may be located in the side member 130 in line with one or more of the pressure plate 120, friction plate(s) 108 and separating plate 154.

The passive centrifugal valve 168 may include a valve body 156 and a valve member 196 moveable between an open position and a closed position. The valve body 156 may have a hollow bore that receives the valve member 196 and defines a valve seat 157. The passive centrifugal valve 168 may include a biasing member 158, for example a spring, disposed inside the valve body 156 which extends between the valve member 196 and a drainage aperture 166. The valve seat 157 may be an annular rim that surrounds the hollow bore. The valve member 196 of the passive centrifugal valve 168 may be configured to move to a closed position when the rotating speed of the flywheel assembly 106 exceeds a threshold rotational speed and to move to, or remain in, an open position if the rotating speed of the flywheel assembly 106 is below the threshold rotational speed. The passive centrifugal valve 168 may help to avoid a premature piston movement to its expanded position thereby connecting an engine to the parasitic load before the engine reaches its sustainable speed and capacity.

In some embodiments the disconnect clutch 100 may be part of a disconnect system 170 on a machine 172 that includes an engine 102, as shown schematically in FIG. 5.

The disconnect system 170 may be disposed on the machine 172 and may include the disconnect clutch 100 operably connected to the engine 102. The fill aperture 132 may be directly connected via the fill conduit 131 through a supply conduit 180 to an engine oil supply gallery of the engine 102.

Also disclosed is a method of controlling a connection of one or more parasitic loads 104 to an engine 102 disposed on a machine 172. The method may comprise rotating a flywheel assembly 106 connected to the engine 102. The flywheel assembly 106 may be disposed inside a flywheel housing. The flywheel housing having a supply conduit 180.

The flywheel assembly 106 having an interior and including (disposed in the interior) a flywheel 114 having a fill conduit 131 leading to a fill aperture 132 that opens into a chamber 116, a piston 118, and a pressure plate 120. The flywheel assembly 106 having an exterior and including (disposed in the exterior) at least one passive centrifugal valve 168 fluidly connected to the chamber 116.

The flywheel 114 and the piston 118 may define the chamber 116. The method may further comprise receiving fluid in the chamber 116 through the fill conduit 131 and the fill aperture 132. The fluid being derived from a supply conduit 180 connected to an engine oil supply gallery of the engine 102. The method including connecting the engine 102 to the one or more parasitic loads 104 by applying an activation force to attach a friction plate 108 to the rotating flywheel assembly 106, wherein the activation force is generated by movement of the piston 118 to an expanded position by fluid contained in the chamber 116, the fluid acting under pressure from the fluid supply gallery and centrifugal force produced by the rotating. The method may also comprise generating an activation force only when a valve member 196 of the passive centrifugal valve 168 is in its closed position. The method may also comprise not generating an activating force when a valve member 196 of the passive centrifugal valve 168 is in open position.

The method may further comprise that the passive centrifugal valve 168 may be configured to move the valve member 196 to its closed position if a rotational speed of the flywheel assembly 106 exceeds a threshold rotational speed and to move the valve member 196 to its open position if the flywheel assembly 106 is stationary or rotating below the threshold rotational speed.

The friction plate 108 may be disposed inside the interior of the flywheel assembly 106 and may be operably connected to the one or more parasitic loads 104.

This method of "passive" control of the disconnect clutch prevents a premature movement of the piston 118 to its expanded position connecting an engine 102 to the parasitic load 104 before the engine 102 reaches its sustained speed and capacity.

In an embodiment, the method may further include disconnecting the engine 102 from the one or more parasitic loads 104 by draining at least a portion of the fluid from the chamber 116 when engine rotating speed or engine gallery pressure drop below the threshold rotational speed. The fluid may be drained through the drainage conduit 160 and out of drainage aperture 166 where it may be returned to the engine oil supply gallery.

In an embodiment, where the flywheel 114 includes a ledge 136 disposed under the piston 118, the method may further include receiving fluid into the chamber 116, and using centrifugal force and fluid supply pressure to move the piston 118 to an expanded position.

In another embodiment, the method may further include controlling the flow of fluid to the chamber 116 based on engine 102 or machine 172 operating parameters.

INDUSTRIAL APPLICABILITY

Engines, particularly diesel engines, can from time to time experience difficulties when starting, particularly in cold ambient temperatures. One contributing factor is the continuous parasitic loads placed on the engine during start-up. In the present disclosure, a disconnect clutch 100 may be utilized to disconnect parasitic loads 104 from an engine 102 during the initial start-up and to automatically connect the parasitic loads 104 once the engine 102 speed is sufficient to develop the torque capacity that is equal to the load applied on the disconnect clutch 100. In some embodiments, the parasitic loads 104 may be connected after the engine 102 speed reaches a low idle speed during start-up and transitions to a higher engine speed.

During initial start-up, the flywheel assembly 106 will rotate with the crankshaft of the engine 102 and fluid from a supply source (for example, engine oil from the engine 102, other lubricating fluids from other sources, or the like) will flow into the chamber 116 through the fill conduit 131 and the fill aperture 132. However, the friction plate(s) 108, which are not yet attached to the flywheel assembly 106, will not rotate with the flywheel assembly 106 (and crankshaft of the engine 102) during initial start-up. Thus, because the friction plate(s) 108 are not operably connected yet to the engine 102 via the flywheel assembly 106, the parasitic loads 104 that are operably connected to the friction plate(s) 108 are also not connected to the engine 102. This eliminates the drag that can be produced by parasitic loads 104 on the engine 102 during initial start-up.

In some embodiments, the disconnect clutch 100 may be part of a disconnect system 170 that disconnects parasitic loads 104 from the engine 102 during idling of the engine 102 as well as at start-up. This provides for more efficient use of the engine 102 because accessories (parasitic loads) that are not in use do not receive power.

The disconnect clutch 100 of the present disclosure does not require an electronic control valve, control system or processor to operate. Instead control of the fluid pressure in the chamber 116 is achieved passively by the passive centrifugal valve 168. This may lead to a simplification of the control systems of the engine 102. The switching of the passive centrifugal valve 168 from its open position to its closed position may be controlled only by the rotational speed of the flywheel assembly 106. A threshold rotational speed of the flywheel assembly 106 may be configured for the disconnect clutch 100. The threshold rotational speed may be set by configuring a suitable parameter of the valve member 196 and/or the biasing member 158. For example, where the biasing member 158 is a spring and the valve member 196 is a ball the spring force of the spring and/or the mass of the ball may be chosen to set the desired threshold rotational speed.

During initial start-up or idling below the threshold rotational speed, fluid is allowed to pass through the supply conduit 180 to the chamber 116 via the fill conduit 131 and fill aperture 132 and also out of the chamber 116 through the drainage conduit 160 and drainage aperture 166 because the valve member 196 is in its open position. As the flywheel assembly 106 continues to rotate below the threshold rotational speed, fluid continues to flow from the engine 102, through the flywheel assembly 106 and back to the engine 102 without the pressure plate 120 being engaged against the friction plate(s) 108.

Once the threshold rotational speed is reached the passive centrifugal valve 168 is closed as the centrifugal forces acting on the valve member 196 overcome the biasing force of the biasing member 158 causing the valve member 196 to move into engagement with the valve seat 157 and close of fluid flow out of the drainage aperture 166. Consequently, pressure will rise in the chamber 116 resulting in the piston 118 moving into its expanded position in which the friction plate(s) 108 are engaged against the pressure plate 120 of the flywheel assembly 106 leading to rotation of the coupling 110 that is operatively connected to the friction plate(s) 108.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally.

All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method of controlling the connection of a parasitic load to an engine disposed on a machine, the method comprising:
   a) rotating a flywheel assembly about an X axis, the flywheel assembly connected to the engine, the flywheel assembly having an interior and including a flywheel, a piston, an end plate attached to a side member of the flywheel, and a chamber disposed in the interior, the chamber defined by the flywheel and the piston;
   b) supplying fluid to the chamber via a fill aperture and controlling fluid passage out of the chamber via a drainage conduit by use of a passive centrifugal valve in the drainage conduit which is movable between an open position and a closed position dependent on a rotational speed of the flywheel assembly, the passive centrifugal valve disposed through the side member of the flywheel, and the passive centrifugal valve is fluidly connected to the chamber by the drainage conduit that extends radially outward towards the end plate at an angle to the X axis from the chamber to the centrifugal valve; and c) connecting the engine to the parasitic load only when a rotational speed of the flywheel assembly exceeds a threshold rotational speed;

wherein connection of the engine to the parasitic load is by movement of the piston to an expanded position to attach a friction plate disposed inside the interior of the rotating flywheel assembly to the rotating flywheel assembly, the friction plate being operably connected to the parasitic load;

movement of the piston to the expanded position is by developing a sufficient fluid pressure in the chamber;

the piston remains in a contracted position with the friction plate disengaged from the rotating flywheel assembly when the passive centrifugal valve is in its open position thereby enabling drainage of the fluid from the chamber through the drainage conduit thereby preventing the sufficient fluid pressure in the chamber being attained;

the piston is moved into the expanded position when the passive centrifugal valve is in its closed position thereby preventing drainage of the fluid from the chamber through the drainage conduit such that the sufficient fluid pressure in the chamber is attained;

wherein the passive centrifugal valve adopts its open position when the flywheel assembly is stationary or rotating below the threshold rotational speed and adopts its closed position when the flywheel assembly is rotating above the threshold rotational speed.

2. The method of claim 1, wherein the passive centrifugal valve is moved from its open position to its closed position solely by centrifugal forces imparted by rotation of the flywheel assembly.

3. The method of claim 1, wherein the passive centrifugal valve comprises a valve member and a valve seat and the valve member reciprocally moves along a valve axis between an unseated position in which the valve member is disengaged from the valve seat and a seated position in which the valve member is engaged with the valve seat; the valve member being unseated when the passive centrifugal valve is in its open position and the valve member being seated when the passive centrifugal valve is in its closed position.

4. The method of claim 3, wherein the valve axis is orientated perpendicularly or substantially perpendicularly to the X axis.

5. The method of claim 3, wherein the valve member is biased to be unseated.

6. The method of claim 1, wherein the fluid is supplied to the chamber from an engine fluid supply gallery of the machine.

7. The method of claim 1, further comprising controlling the supplying of fluid to the chamber based on engine or machine operating parameters.

8. A disconnect clutch comprising:

a) a flywheel assembly rotatable about an X axis that includes;

a flywheel having a cavity, the flywheel including an end plate attached to a side member of the flywheel; and a chamber disposed inside the cavity and defined by the flywheel and a piston; the piston being disposed inside the cavity and moveable between a contracted position and an expanded position;

b) at least one friction plate disposed inside the cavity between the piston and the end plate, the at least one friction plate attached to and rotatable with the flywheel assembly when the piston is in the expanded position and spaced apart from the flywheel assembly and generally stationary when the piston is in the contracted position; and c) a coupling operably connected to the friction plate;

the flywheel comprising a fill aperture for supplying fluid to the chamber and a drainage conduit for removing fluid from the chamber;

the drainage conduit comprising a passive centrifugal valve which is movable between an open position and a closed position dependent on a rotational speed of the flywheel assembly, the passive centrifugal valve disposed through the side member of the flywheel, and the passive centrifugal valve is fluidly connected to the chamber by the drainage conduit that extends radially outward towards the end plate at an angle to the X axis from the chamber to the centrifugal valve;

the passive centrifugal valve adopting its open position when the flywheel assembly is stationary or rotating below a threshold rotational speed such that fluid supplied to the chamber through the fill aperture is able to be removed through the drainage conduit without creating sufficient pressure in the chamber to move the piston from the contracted position to the expanded position; and the passive centrifugal valve adopting its closed position when the flywheel assembly is rotating above the threshold rotational speed such that fluid supplied to the chamber through the fill aperture is unable to be removed through the drainage conduit leading to sufficient pressure being developed in the chamber to move the piston from the contracted position to the expanded position.

9. The disconnect clutch as claimed in claim 8, wherein the passive centrifugal valve is configured to be moved from its open position to its closed position solely by centrifugal forces imparted by rotation of the flywheel assembly.

10. The disconnect clutch as claimed in claim 8, wherein the drainage conduit extends through a body of the flywheel between a drain aperture in a wall of the chamber and an exit aperture of the passive centrifugal valve.

11. The disconnect clutch as claimed in claim 8, wherein the drainage conduit exits the flywheel on a side surface of the flywheel.

12. The disconnect clutch as claimed in claim 8, wherein the passive centrifugal valve comprises a valve member and a valve seat with the valve member being configured to be reciprocally movable along a valve axis between an unseated position in which the valve member is disengaged from the valve seat and a seated position in which the valve member is engaged with the valve seat; the valve member being in its unseated position when the passive centrifugal valve is in its open position and the valve member being in its seated position when the passive centrifugal valve is in its closed position.

13. The disconnect clutch as claimed in claim 12, wherein the valve axis is orientated perpendicularly or substantially perpendicularly to the X axis.

14. The disconnect clutch as claimed in claim 12, wherein the passive centrifugal valve comprises a biasing member which biases the valve member into its unseated position.

15. The disconnect clutch as claimed in claim 8, wherein the flywheel assembly further comprises a pressure plate disposed inside the cavity between the piston and the friction plate, the pressure plate being engaged against the at least one friction plate when the piston is in the expanded position and being spaced apart from the friction plate and rotatable with the flywheel assembly when the piston is in the contracted position.

16. The disconnect clutch as claimed in claim 8, wherein the at least one friction plate is a plurality of friction plates.

17. The disconnect clutch as claimed in claim 16, further comprising a separating plate disposed in the cavity between a first friction plate and a second friction plate.

18. A machine comprising a disconnect clutch which is connected between an engine of the machine and a parasitic load of the machine; the disconnect clutch comprising:
   a) a flywheel assembly rotatable about an X axis that includes;
   a flywheel having a cavity, the flywheel including an end plate attached to a side member of the flywheel; and
   a chamber disposed inside the cavity and defined by the flywheel and a piston; the piston being disposed inside the cavity and moveable between a contracted position and an expanded position;
   b) a friction plate disposed inside the cavity between the piston and the end plate, the friction plate attached to and rotatable with the flywheel assembly when the piston is in the expanded position and spaced apart from the flywheel assembly and generally stationary when the piston is in the contracted position; and
   c) a coupling operably connected to the friction plate;
   the flywheel comprising a fill aperture for supplying fluid to the chamber and a drainage conduit for removing fluid from the chamber,
   the drainage conduit comprising a passive centrifugal valve which is movable between an open position and a closed position dependent on a rotational speed of the flywheel assembly, the passive centrifugal valve disposed through the side member of the flywheel, and the passive centrifugal valve is fluidly connected to the chamber by the drainage conduit that extends radially outward towards the end plate at an angle to the X axis from the chamber to the centrifugal valve;
   the passive centrifugal valve adopting its open position when the flywheel assembly is stationary or rotating below a threshold rotational speed such that fluid supplied to the chamber through the fill aperture is able to be removed through the drainage conduit without creating sufficient pressure in the chamber to move the piston from the contracted position to the expanded position; and
   the passive centrifugal valve adopting its closed position when the flywheel assembly is rotating above the threshold rotational speed such that fluid supplied to the chamber through the fill aperture is unable to be removed through the drainage conduit leading to sufficient pressure being developed in the chamber to move the piston from the contracted position to the expanded position.

19. The machine of claim 18, wherein the fill aperture of the flywheel is fluidly connected to an engine fluid supply gallery of the machine; and wherein the fill aperture of the flywheel is directly connected to the engine fluid supply gallery of the machine.

20. The machine of claim 19, wherein the disconnect clutch is disposed in a clutch housing and the clutch housing comprises a fluid supply conduit connecting the engine fluid supply gallery to the fill aperture.

* * * * *